United States Patent
Wiman et al.

[11] Patent Number: 5,897,272
[45] Date of Patent: Apr. 27, 1999

[54] CUTTING INSERT HAVING A MICRO RIDGE CHIP BREAKER

[75] Inventors: Jörgen Wiman; Jonas Näslund, both of Sandviken; Anders Jonsson, Gävle, all of Sweden

[73] Assignee: Sandvik AB, Sandviken, Sweden

[21] Appl. No.: 08/765,194

[22] PCT Filed: Jun. 30, 1995

[86] PCT No.: PCT/SE95/00810

§ 371 Date: Feb. 28, 1997

§ 102(e) Date: Feb. 28, 1997

[87] PCT Pub. No.: WO96/01164

PCT Pub. Date: Jan. 18, 1996

[30] Foreign Application Priority Data

Jul. 5, 1994 [SE] Sweden .................................. 9402378

[51] Int. Cl.$^6$ .................................................. B23B 27/22
[52] U.S. Cl. ......................... 407/114; 407/115; 407/116; 407/119
[58] Field of Search .................... 407/114, 113, 407/115, 116, 119, 118

[56] References Cited

U.S. PATENT DOCUMENTS

| | | | |
|---|---|---|---|
| 2,053,977 | 9/1936 | Taylor | 407/119 X |
| 3,792,515 | 2/1974 | Lundgren | |
| 3,973,307 | 8/1976 | McCreery et al. | |
| 4,218,160 | 8/1980 | Arnold | 407/114 |
| 4,318,645 | 3/1982 | McCreery | |
| 4,340,324 | 7/1982 | McCreery | |
| 4,626,141 | 12/1986 | Malaker et al. | 407/114 |
| 4,643,620 | 2/1987 | Fujii et al. | 407/119 |
| 4,710,069 | 12/1987 | Loqvist | |
| 4,963,061 | 10/1990 | Katbi et al. | |
| 4,966,501 | 10/1990 | Nomura et al. | 407/119 |
| 4,988,242 | 1/1991 | Pettersson et al. | |
| 5,044,840 | 9/1991 | Fouquer et al. | |
| 5,116,167 | 5/1992 | Niebauer | 407/116 X |
| 5,197,831 | 3/1993 | Shiratori et al. | |

FOREIGN PATENT DOCUMENTS

| | | |
|---|---|---|
| 4 118 068 | 12/1992 | Germany . |
| 62/34707 | 2/1987 | Japan . |
| 2 093 379 | 9/1982 | United Kingdom . |

*Primary Examiner*—Andrea L. Pitts
*Assistant Examiner*—Henry W. H. Tsai
*Attorney, Agent, or Firm*—Burns, Doane, Swecker & Mathis, L.L.P.

[57] ABSTRACT

A cutting insert includes a cemented carbide body having two main cutting edges joined by a corner cutting edge. A primary land extends behind the corner and main cutting edges. A chip breaker in the form of a micro ridge projects upwardly from a section of the primary land located in the vicinity of the cutting corner. The primary land has a width in the range of 0.1 to 0.8 mm, and the micro ridge has a width which is between 25 and 80 percent of the width of the primary land.

13 Claims, 2 Drawing Sheets

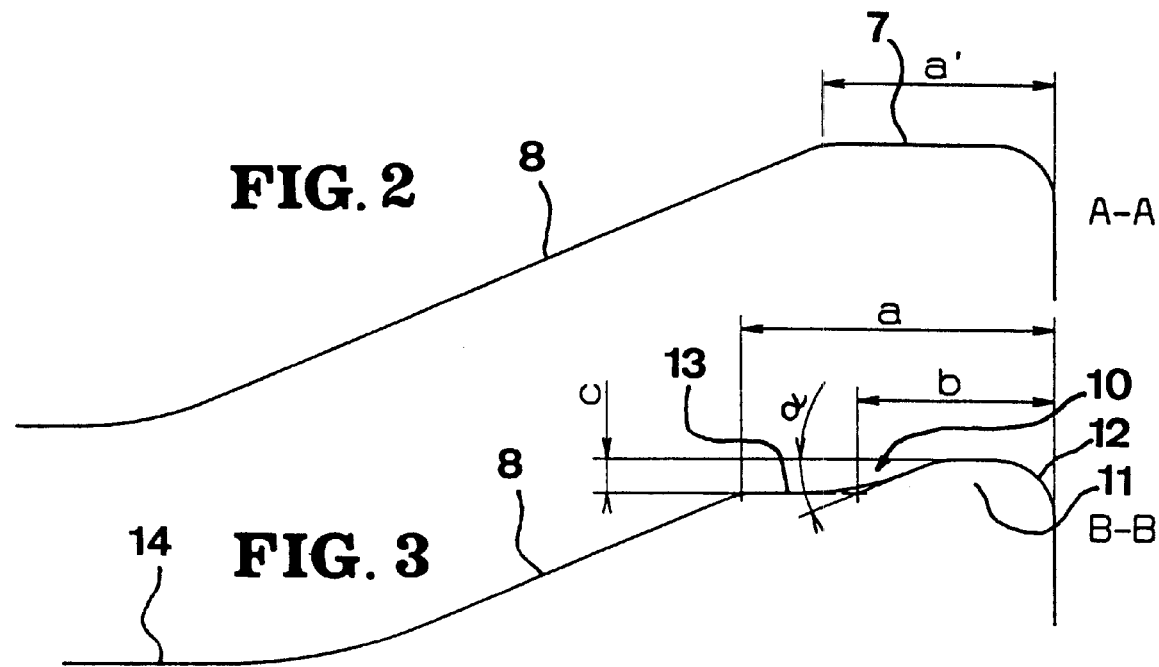
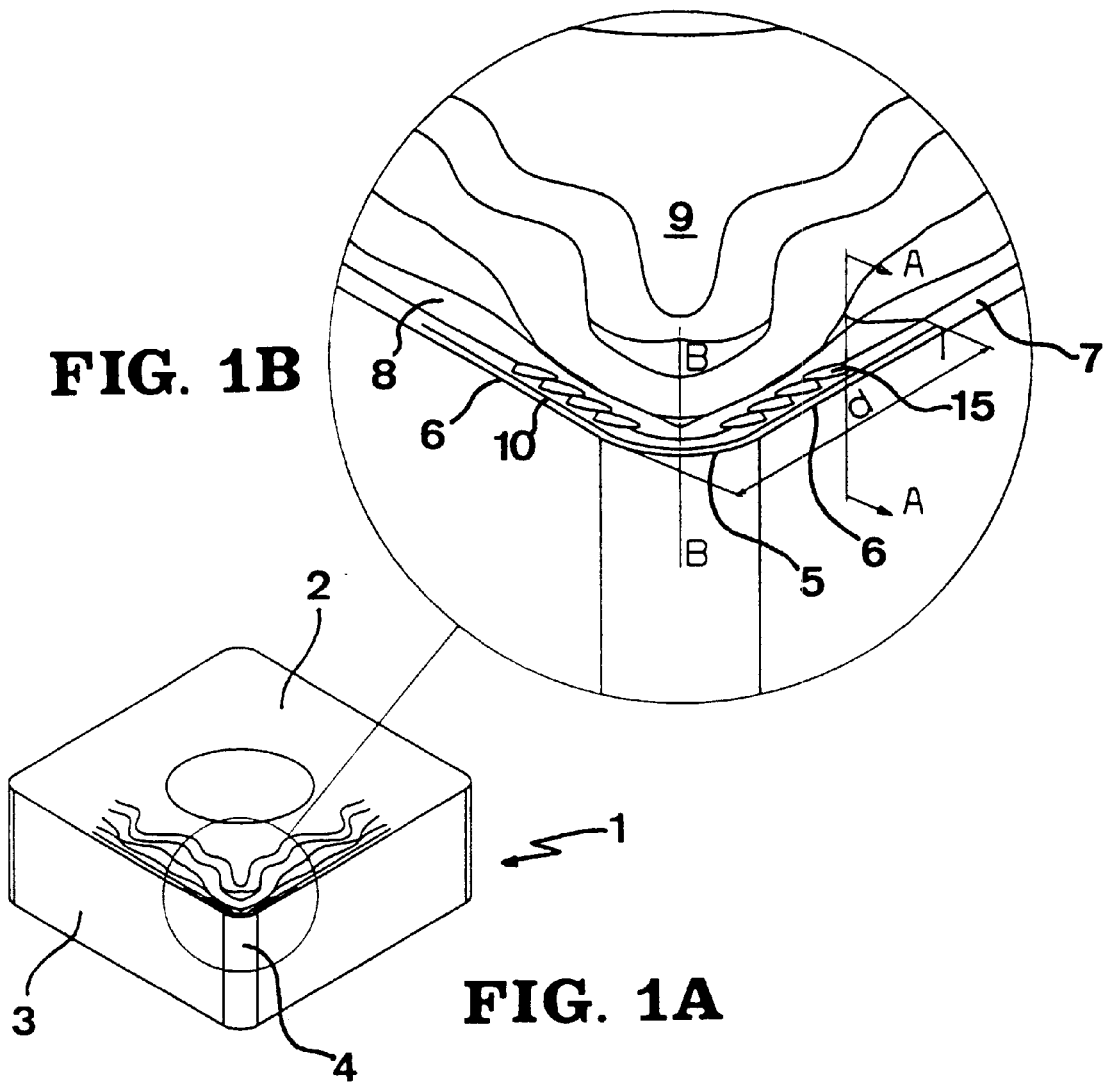

CUTTING INSERT HAVING A MICRO RIDGE CHIP BREAKER

BACKGROUND OF THE INVENTION

The present invention relates to a cutting insert, preferably an indexable cutting insert for turning, which insert comprises a micro chip breaker. The cutting insert may be single- or double-sided.

It is previously known to provide turning cutting inserts with chip breakers formed in the rake surfaces of the insert, which breakers extend along the edges of the insert which form cutting edges. These chip breakers may be formed in one or several steps.

Thus, in Swedish Patent 349 759 and Lundgren U.S. Pat. No. 3,792,515 a turning cutting insert is disclosed with two chip breaking steps being located behind each other, both of which are substantially parallel with the cutting edge. At smaller chip thicknesses, the chip is broken by the first chip breaking step, located next to the cutting edge. At increasing chip thickness, the chip passes to a larger extent over the first step and goes downwardly into the second chip breaking step. For tough materials that obtain a small initial bending, the chip will in some cases get downwardly the whole way to the bottom of the second step and be broken against it. This construction with two chip breaking steps gives a smoother chip breaking at larger chip thicknesses compared to previously used embodiments. However, at small feeds no satisfactory chip breaking is effected. A rule of thumb is usually that the smallest possible feed generally corresponds to the width of the primary land surface. The commercial cutting inserts corresponding to Swedish Patent 349 759 have a smallest primary land surface width of about 0.3 mm. Thus, if one uses smaller feeds than 0.3 mm, no acceptable chip breaking is attained with these cutting inserts.

When requirements of a smooth surface on the workpiece are high, fine turning is applied. This implies feeds down to 0.1 mm, which is not feasible in combination with good chip breaking with the known inserts referred to above.

A further disadvantage at small feeds is that the wear on the primary land increases, due to the direct abutment of the chips against this surface. Further, the flaking tendency of the surface coating increases when the inserts are coated, which is the most common case. These coatings usually consist of $Al_2O_3$, titanium nitride and/or titanium carbide and are applied in a way known per se by so called PVD or CVD technique.

A primary object of the present invention is thus to provide a cutting insert which makes possible fine turning with an acceptable chip breaking.

A second object of the present invention is to increase the face wear resistance on the insert's primary land.

Still another object of the present invention is to improve the flaking resistance for surface coated inserts.

Yet another object of the present invention is to reduce the cutting forces.

A still further object of the present invention is to provide a cutting insert which makes possible both normal and fine machining.

SUMMARY OF THE INVENTION

These and further objects have been attained by forming the insert with a micro chip breaker in the form of a micro ridge projecting upwardly from a section of a primary land of the cutting insert. The primary land has a first width in the range of 0.1 to 0.8 mm and the micro ridge has a second width which is between 25 and 80 percent of the first width.

BRIEF DESCRIPTION OF THE DRAWINGS

For illustrative but non-limiting purposes, the invention will now be further described with reference to the appended drawings. These are presented herewith:

FIG. 1A is a perspective view of a cutting insert according to the invention, seen obliquely from above.

FIG. 1B is an enlargement of the encircled corner section of the cutting insert according to FIG. 1A.

FIG. 2 shows the section 2—2 in FIG. 1B.

FIG. 3 shows the section 3—3 in FIG. 1B.

DETAILED DESCRIPTION OF THE PREFERRED EMBODIMENTS OF THE INVENTION

Figure 4B:
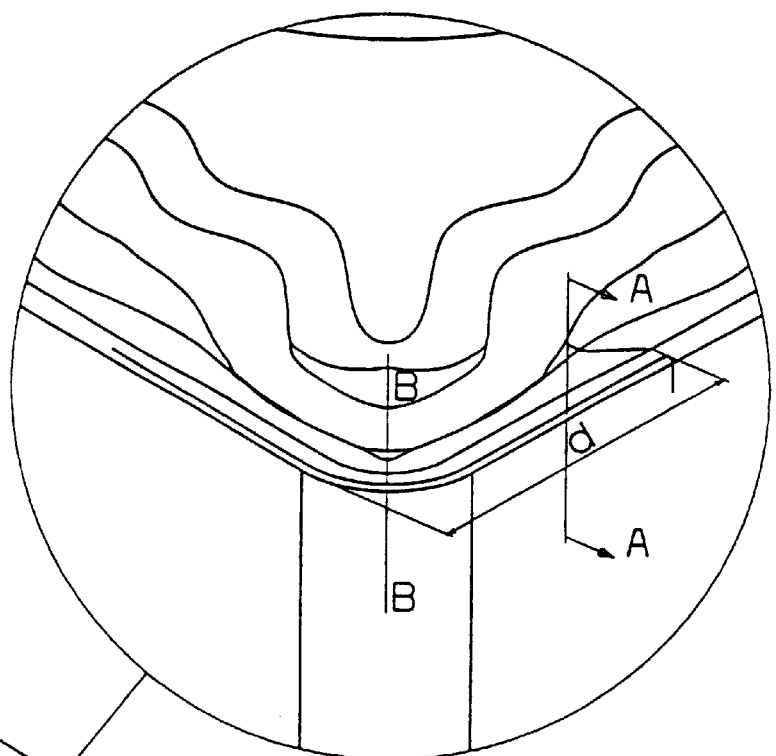
FIG. 4B is an enlargement of the corner section of the cutting insert according to FIG. 4A.

A cutting insert according to the invention is generally designated by 1. It comprises an upper rake surface 2 and, if it is a double-sided insert, also a substantially equal lower rake surface. Between these two main surfaces extend the side surfaces 3. In FIG. 1A (and also 4A) a cutting insert is illustrated with a square basic shape but it may of course also have another polygon basic shape, such as triangular, rectangular, hexagonal, rhombic, etc. The essential feature in common for all these shapes is that at least two side surfaces 3 join in an operative, rounded cutting corner 4, whose form is more clearly shown in FIG. 1B. This has a rounded point or corner cutting edge 5 and two main cutting edges 6 extending from the corner cutting edge. A primary land 7 adjoins immediately behind the cutting edges, which land may have either a postive or negative inclination but usually is substantially planar and parallel with the plane of the rake surface 2. A downwardly sloping chip angle surface 8 extends behind the primary land 7. Since the illustrated insert is double-sided, there is a planar support surface 9 on the upper surface 2. However, this and the other geometry on the rake surface of the insert do not constitute any essential features of the present invention, which rather relates to the existance of a micro chip breaker 10 in connection with the cutting corner.

Thus, the essential feature of the present invention is the existance of a so called micro chip breaker 10. This may extend around the whole cutting insert but should at least extend along the cutting edge portions which become operatively engaged with a workpiece. These portions comprise on one hand the rounded corner cutting edge 5 and on the other hand a certain portion of the two main cutting edges 6. A micro ridge 11 projects upwardly from a section of the primary land 7, which section is disposed behind the corner cutting edge and portions of the main cutting edges. The micro ridge is located along a front portion of that section of the primary land, whereby a portion 13 of that section of the primary land extends behind the micro ridge, as shown in FIG. 3. From comparison between FIGS. 2 and 3, it may be clearly seen that the micro ridge 11 of the micro chip breaker terminates at the location where section 2—2 is taken in FIG. 1. The micro may either progressively diminish or terminate abruptly, the former being preferred. The distance d from the corner to the seccion 2—2 in FIG. 1B (and in FIG. 4B) constitutes the length of a micro ridge along one of the edges of the insert. That distance d may vary between 10 and 50% of the total length td of the insert's edge, preferably between 20 and 40%.

The micro chip breaker shown in FIG. 3 is for instance produced by shaping the pressing tool with a corresponding micro geometry. It may also be obtained by grinding. The width b of the micro ridge 11 suitably constitutes between 25 and 80%, preferably between 45 and 70%, of the total width a of the primary land 7. This width a is between 0.1 and 0.8 mm, suitably between 0.1 and 0.6 mm, preferably between 0.15 and 0.4 mm and in particular between 0.2 and 0.35 mm.

The width of the primary land normally diminishes when the micro ridge 11 terminates, which may be seen on the measure a' in FIG. 2. The height c of the micro ridge is suitably between 0.01 and 0.1 mm, preferably between 0.015 and 0.06 mm.

The micro ridge 11 adjoins directly to the main cutting edge and the corner cutting edge, respectively. This connection may take place along a sharp break line but preferably occurs over a cutting edge rounding 12, preferrably with a radius of between 15 and 60 $\mu$m.

Thanks to the double-working chip breaking geometry, so far unattained combination possibilities have been obtained on one and the same cutting insert. Thus, one and the same cutting insert may be used for both fine and normal turning. During fine turning with a feed of for instance 0.15 mm/revolution the chips are broken against the planar primary land portion 13 which is located behind the micro ridge 11. The angle $\alpha$ formed between a down ward extension e of the primary land portion 13 and the rear side s of the micro ridge is suitably between 10 and 40°. preferably between 15 and 30°. At more ordinary feeds, for instance between 0.5 and 0.6 mm/revolution, the chips flow over the micro chip breaker and downwardly along the chip angle surface 8, to be broken in the recess or the elongated depression 14 disposed behind the chip angle surface 8. Moreover, the existence of a micro ridge has reduced the flaking of coating on the promary land and has also increased the face wear resistance on the primary land.

Figure 4A:
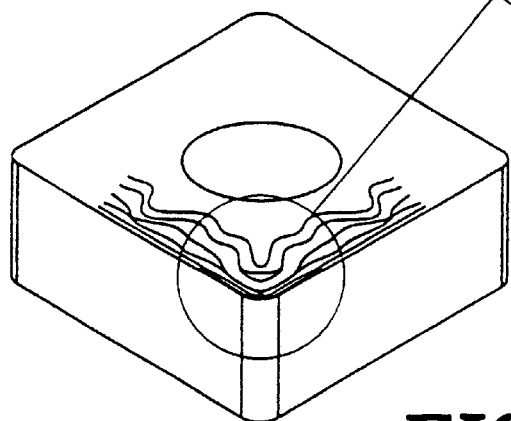
FIG. 4A is a perspective view of another cutting insert according to the invention, seen obliquely from above.

In order to diminish the transferred heat from the chip to the cutting insert, and to steer the chips away from the produced surface, depressions 15 may be formed at the transition between the primary land portion 13 and the chip angle surface 8. Such depressions are further described in for instance Pettersson et al. U.S. Pat. No. 4,988,242, which is hereby incorporated into this application by this reference. However, the existence of such depressions only constitutes one preferred embodiment of the present invention and may thus be dispensed with, as may be seen in FIGS. 4A and 4B. Thus, the cross sections shown in FIGS. 2 and 3 (which do not depict the depressions) are also applicable to FIG. 4B.

Eventually, it should be pointed out that the geometry of the upper surface has only been drawn for one of the four corners. Of course, the rake surface geometry may be formed in a corresponding way also in the other corners.

We claim:

1. A cutting insert comprising a polygonally shaped body formed of a hard material and comprising:
    an upper rake surface; and
    at least two side surfaces connected to one another by a rounded cutting corner, the side surfaces intersecting the upper rake surface to form respective main cutting edges therewith, the cutting corner intersecting the upper rake surface to form a corner cutting edge;
    the upper rake surface including:
        a primary land disposed behind the main cutting edges and the corner cutting edge, and
        a chip breaker in the form of micro ridge projecting upwardly from a section of the primary land situated behind the corner cutting edge and behind a portion of at least one of the main cutting edges, such that the portion of the primary land extends behind the micro ridge,
        the section of the primary land having a first width in the range of 0.2 to 0.35 mm, and the micro ridge having a second width which is between 25 and 80 percent of the first width, wherein the micro ridge extends upwardly from the primary land by a distance of between 0.015 and 0.06 mm.

2. The cutting insert according to claim 1, wherein the corner cutting edge and main cutting edges are rounded.

3. The cutting insert according to claim 1, wherein the upper rake surface further includes a sloping surface which slopes downwardly behind the section of the primary land, and a plurality of depressions formed in the upper rake surface, each depression overlapping the sloping surface and the section of the primary land.

4. The cutting insert according to claim 1, wherein the body includes a lower rake surface disposed opposite the upper rake surface and shaped identically thereto.

5. A cuffing insert comprising a polygonally shaped body formed of a hard material and comprising:
    an upper rake surface; and
    at least two side surfaces connected to one another by a rounded cutting corner, the side surfaces intersecting the upper rake surface to form respective main cutting edges therewith, the cutting corner intersecting the upper rake surface to form a corner cutting edge;
    the upper rake surface including:
        a primary land disposed behind the main cutting edges and the corner cutting edge, and
        a chip breaker in the form of micro ridge projecting upwardly from a section of the primary land situated behind the corner cutting edge and behind a portion of at least one of the main cutting edges, such that the portion of the primary land extends behind the micro ridge,
        the section of the primary land having a first width in the range of 0.1 to 0.8 mm, and the micro ridge having a second width which is between 25 and 80 percent of the first width, wherein a length of the micro ridge along one edge of the insert is between 10 and 50% of the length of that edge of the insert.

6. The cutting insert according to claim 5, wherein the first width is in the range of 0.1 to 0.6 mm.

7. The cutting insert according to claim 5, wherein the micro ridge extends upwardly from the primary land by a distance of between 0.01 and 0.1 mm.

8. The cutting insert according to claim 5, wherein the corner cutting edge and main cutting edges are rounded.

9. The cutting insert according to claim 5, wherein the upper rake surface further includes a sloping surface which slopes downwardly behind the section of the primary land, and a plurality of depressions formed in the upper rake surface, each depression overlapping the sloping surface and the section of the primary land.

10. The cutting insert according to claim 5, wherein the body includes a lower rake surface disposed opposite the upper rake surface and shaped identically thereto.

11. The cutting insert according to claim 5, wherein the hard material is cemented carbide.

12. The cutting insert according to claim 5, wherein the hard material is a coated cemented carbide.

13. A cutting insert comprising a polygonally shaped body formed of a hard material and comprising:
    an upper rake surface; and
    at least two side surfaces connected to one another by a rounded cutting corner, the side surfaces intersecting the upper rake surface to form respective main cutting edges therewith, the cutting corner intersecting the upper rake surface to form a corner cutting edge;
    the upper rake surface including:
        a primary land disposed behind the main cutting edges and the corner cutting edge, and
        a chip breaker in the form of micro ridge projecting upwardly from a section of the primary land situated behind the corner cutting edge and behind a portion of at least one of the main cutting edges, such that the portion of the primary land extends behind the micro ridge, the section of the primary land having a first width in the range of 0.1 to 0.8 mm, and the micro ridge having a second width which is between 25 and 80 percent of the first width, wherein the upper rake surface further includes a sloping surface which slopes downwardly behind the section of the primary land, and a plurality of depressions formed in the upper rake surface, each depression overlapping the sloping surface and the section of the primary land.

* * * * *